(12) United States Patent
Arena et al.

(10) Patent No.: US 6,748,370 B2
(45) Date of Patent: Jun. 8, 2004

(54) INTEGRATED CELLULAR NETWORK STRUCTURE THAT IS PROGRAMMABLE FOR SOLVING DIFFERENTIAL EQUATIONS

(75) Inventors: Paolo Arena, Gravina di Catania (IT); Luigi Occhipinti, Ragusa (IT); Marco Branciforte, Catania (IT); Giovanni Di Bernardo, Mascalucia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 437 days.

(21) Appl. No.: 09/898,906

(22) Filed: Jul. 3, 2001

(65) Prior Publication Data

US 2002/0059160 A1 May 16, 2002

(30) Foreign Application Priority Data

Jul. 4, 2000 (EP) .............................. 00830467

(51) Int. Cl.[7] .......................... G06F 15/18; G06F 7/00; G06E 1/00
(52) U.S. Cl. ........................ 706/14; 706/10; 700/226
(58) Field of Search ................. 706/14, 10; 700/226

(56) References Cited

U.S. PATENT DOCUMENTS 5,680,070 A 10/1997 Anderson et al. ............ 327/336
5,691,664 A 11/1997 Anderson et al. ............ 327/565

OTHER PUBLICATIONS

Arena, P. et al., "Reaction–Diffusion CNN chip. Part1: IC Implementation," *IEEE International Symposium on Circuits and Systems*, Geneva, Switzerland, May 28–31, 2000, pp.III–419—III–422.

Arena, P. et al., "Autowaves for Motion Control: A CNN Approach," *Proceedings of the 1998 IEEE International Symposium on Circuits and Systems*, Monterey, CA, USA, May 31–Jun. 3, 1999, pp.III–163—III–166, 1998.

*Primary Examiner*—George B. Davis
(74) *Attorney, Agent, or Firm*—Lisa K. Jorgenson; E. Russell Tarleton; Seed IP Law Group PLLC

(57) ABSTRACT

An integrated cellular network structure that is programmable to solve partial derivative differential equations in order to control a phenomenon of diffusion or a propagation of electric drive pulses for robot actuators. Such structure includes analog and digital portions interconnected with each other; the analog portion having a matrix array of analog cells arranged to receive data from an I/O interface, and the digital portion having first and second memory arrays for storing a desired configuration and the initial state of such analog matrix array, respectively.

15 Claims, 11 Drawing Sheets

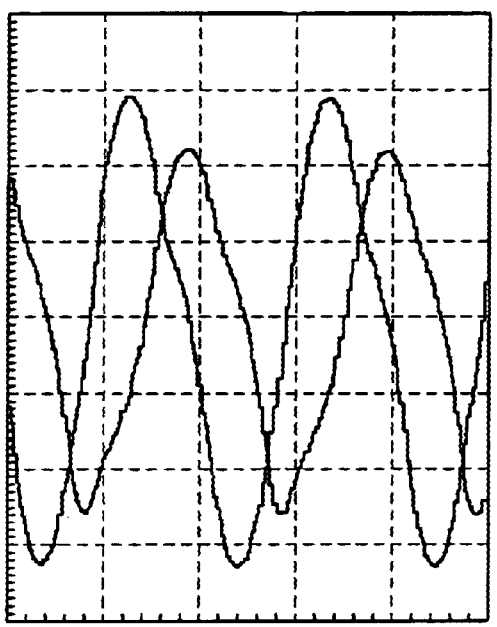
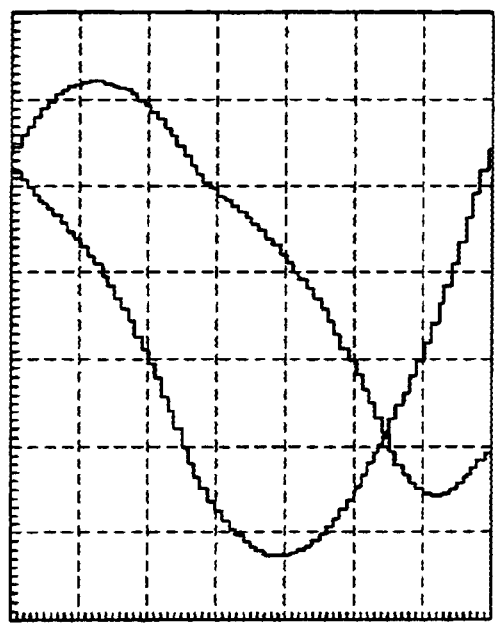
*FIG. 7A*     *FIG. 7B*
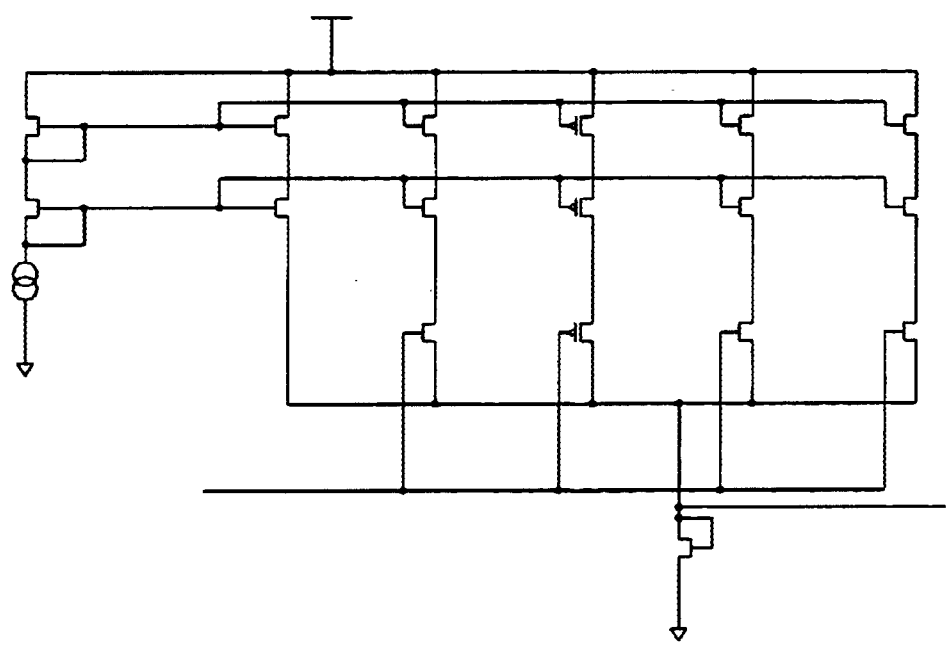
*FIG. 8*

INTEGRATED CELLULAR NETWORK STRUCTURE THAT IS PROGRAMMABLE FOR SOLVING DIFFERENTIAL EQUATIONS

BACKGROUND OF THE INVENTION

1. Field of the Invention

The present invention relates to an integrated cellular network structure that can be programmed to solve partial derivative differential equations.

In particular, the invention relates to an integrated cellular network structure that can be programmed to solve partial derivative differential equations in order to control a phenomenon of diffusion or propagation of electric drive pulses for robot actuators.

2. Description of the Related Art

Reported in the pertinent literature are several examples of possible realizations of single-layer cellular neural networks primarily intended for the real-time processing of images.

By way of example, the report of the conference Micro-Neuro '99, "CNNUC3: A Mixed-Signal 64×64 CNN Universal Chip" by G. Liñan, S. Espejo, R. Domínguez-Castro, E. Roca, Á. Rodriguez-Vasquez, is reported among such several examples.

Another noteworthy prior solution to perform a single-layer cellular neural network is disclosed in the U.S. Pat. No. 5,140,670 to L. O. Chua and L. Yang.

Although in many ways advantageous and substantially achieving their objectives, these prior solutions are limited in applicability and difficult to adapt to the processing of partial derivative differential equations of the second order.

Research work in electronics and in physics of semiconductors is aimed at developing CMOS technology integrated systems that can solve, in real time, a particular type of second-order partial derivative differential equations, known as reaction-diffusion equations.

The importance of such equations derive from the biological research, and especially from the study of nervous tissues, where many phenomena of wave-propagation have been detected which can be readily described with mathematical models of the reaction-diffusion type. Besides the biological field, there are numerous phenomena, such as chemical reactions, combustion, etc., that exhibit the same characteristics.

As described in many documents, particularly in European Patent Application No. 0 997 235 in the name of the same applicant, cellular neural networks have become excellent tools for solving such equations, though not in their most traditional known versions.

The underlying technical problem of the present invention is to provide an analog and digital cellular neural network integrated circuital structure with such structural and functional features as to allow partial derivative differential equations to be generated and controlled, and the network initial conditions and control parameters to be programmed.

BRIEF SUMMARY OF THE INVENTION

The disclosed embodiments of this invention provide a network wherein the values of the parameters of equations to be generated can be defined, and the form of the structure re-defined. Thus, the whole available array or just one or a few portions thereof can be used with different parameters and forms. Also, since the phenomena to be generated may have different time constants, the typical frequency of an individual cell can be varied within a broad range (1 MHz to 1 Hz).

Furthermore, the embodiments of the invention are very different from conventional cellular neural networks not only by its structure but also in the respect of its programmability.

The features and advantages of an integrated structure according to the invention will be apparent in the following description of an embodiment thereof, given by way of example and not of limitation with reference to the accompanying drawings.

BRIEF DESCRIPTION OF THE SEVERAL VIEWS OF THE DRAWINGS

FIGS. 7A and 7B show diagrams of response vs. time constant of the inventive structure.

FIG. 8 shows one embodiment of a portion of the cell structure of FIG. 2.

FIGS. 15A and 15B show diagrams of characteristic curves of elements provided in the cell of FIG. 2.

DETAILED DESCRIPTION OF THE INVENTION

Figure 3:
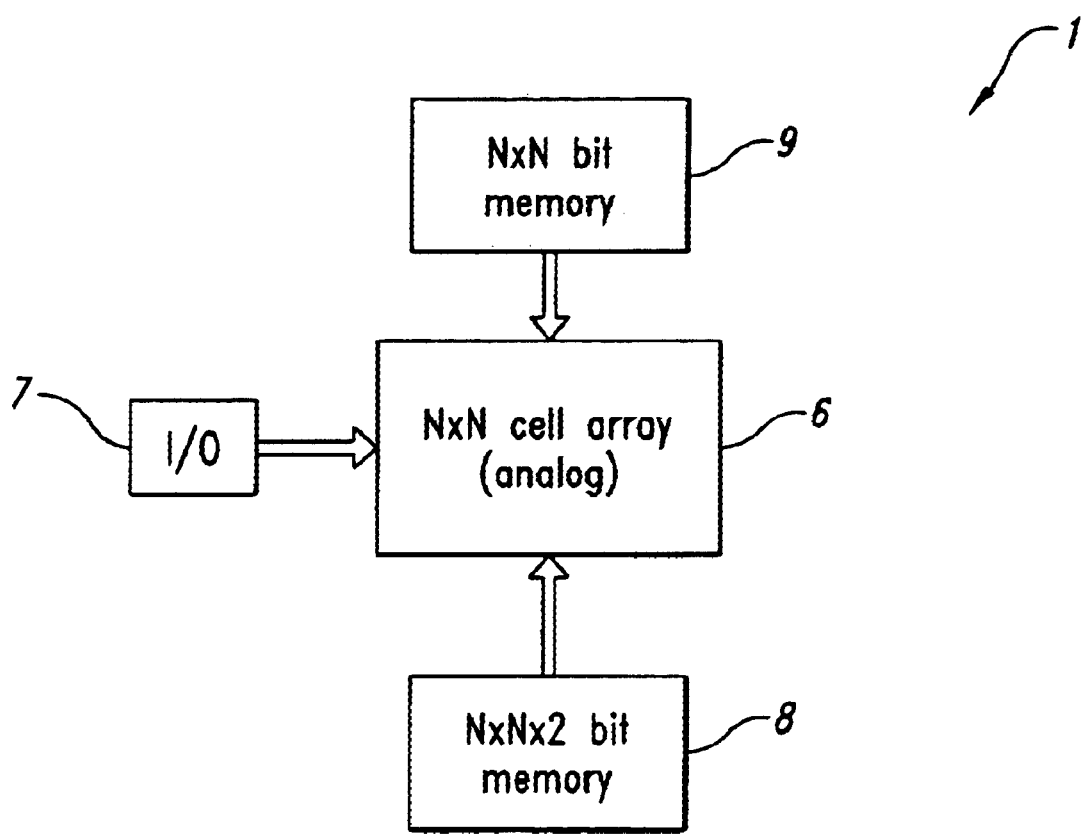
FIG. 3 is a schematic block diagram of an integrated, programmable cellular network structure according to this invention.

With reference to the drawing views, specifically to the example of FIG. 3, a programmable cellular network integrated structure according to this invention is generally shown at 1 in schematic form.

The structure 1 comprises a plurality of cells 2 arranged into an N×N matrix, as described hereinafter in relation to FIG. 2.

More particularly, the invention relates to a cellular network integrated structure 1 that can be programmed to solve partial derivative differential equations in order to control a phenomenon of electric drive pulse diffusion or propagation to robot actuators. The structure 1 comprises an analog portion and a digital portion interconnected to each other.

The analog portion comprises a matrix array 6 of analog cells 2 arranged to receive data from an I/O interface 7, and the digital portion comprises first and second memory arrays 8 and 9 for storing up a desired configuration and the initial state, respectively, of the analog array 6.

The basic mathematical model of an individual cell 2 is represented by a system of partial derivative equations of the second order as described in expression (1) below:

$$dX1;i,j/dt = -X1;i,j+(1+\mu+\epsilon)Y1;i,j-s1Y1;i,j+D1(Y1;i-1,j+Y1;i+1,j+Y1;i,j-1++Y1;i,j+1-4Y1;i,j) \quad (1)$$

$$dX2;i,j/dt = -X2;i,j+(1+\mu+\epsilon)Y2;i,j-s2Y2;i,j+D2(Y2;i-1,j+Y2;i+1,j+Y2;i,j-1++Y2;i,j+1-4Y1;i,j) \quad (2)$$

$$Yk;i,j = 0,5(|Xk;i,j+1|-|Xk;i,j-1|) \quad (3)$$

For particular parameter values, the state variables in the above system of equations describe a borderline cycle characterized by a slow-fast dynamic, that is a dynamic wherein two separate dynamic processes co-exist which have deeply different kinetic characteristics.

Figure 1A:
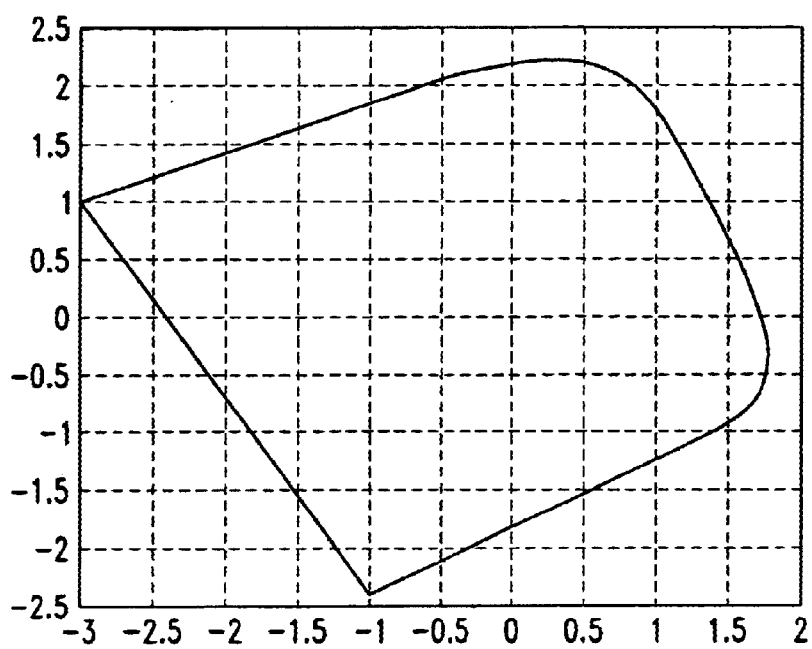
FIGS. 1A and 1B are schematic views showing the dynamic with respect to the phases and the time domain for the state variables of a generic analog cell incorporated in the integrated structure according to the present invention.
Figure 1B:
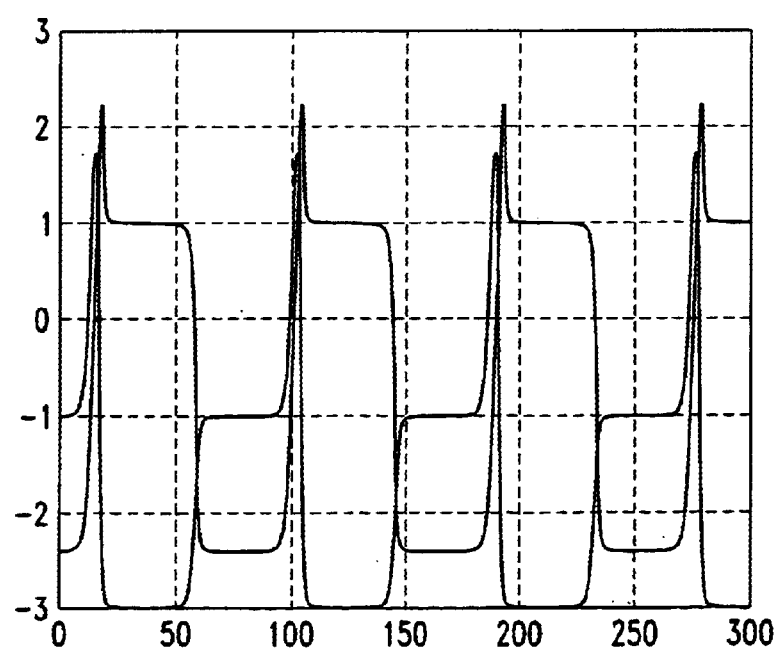

FIGS. 1A and 1B show the dynamic with respect to the phases and the time domain for the state variables of a generic cell.

These dynamics produced by the individual cells, in combination with a phenomenon of diffusion between cells, result in an overall behavior which can be likened to a reaction-diffusion process exhibiting similar characteristics in several chemio-physical phenomena, as well as in the propagation of self-supporting waves for transport purposes.

An object of this invention is to provide an integrated programmable device which can generate electric pulses for driving such phenomena in order to control locomotion actuators, e.g., the actuators disclosed in the European Patent Application No. 0 997 235 in the name of the same Applicant.

"Programming" such devices means pre-arranging a suitable set of initial and boundary conditions, both as relates to programming the characterizing parameters of an individual cell or to re-configuring the structure of the cell matrix array, as well as the possibility of changing the time constant of each cell.

To integrate the functions of a circuit architecture of the aforementioned type in a single device on silicon, one possible monolithic circuital implementation will be considered by way of example, without this being limitative of the invention scope.

Figure 2:
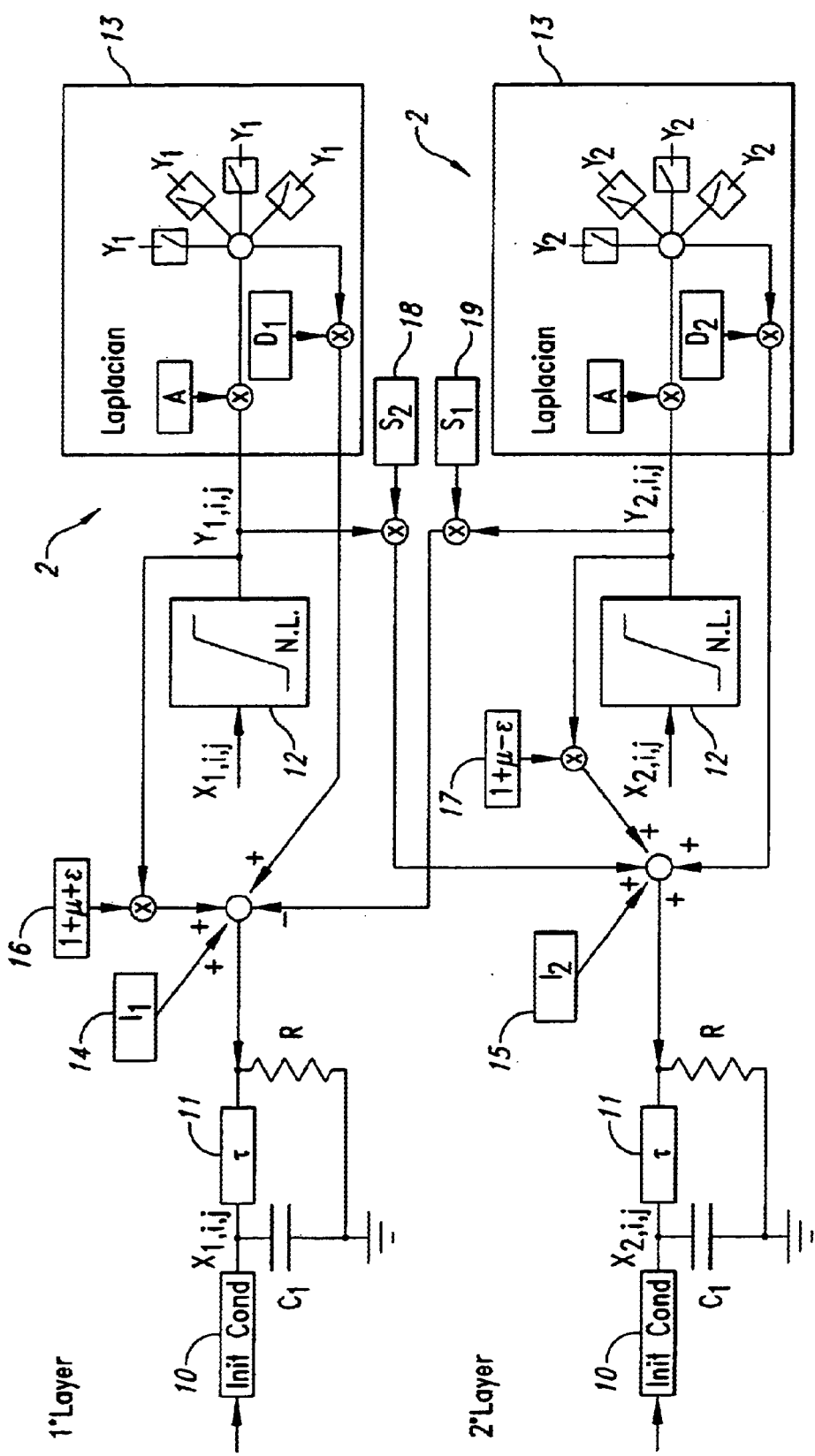
FIG. 2 is a schematic view showing simplified blocks of the circuital architecture of an individual programmable cell in its parameters and in its initial state, according to the invention.

FIG. 2 shows a simplified block diagram of the architecture of an individual cell 2 whose parameters and initial state can be programmed in accordance with the invention, as previously outlined.

The cell 2 comprises an analog core 3 and a set of registers wherein the values of the equation parameters and of the initial conditions are stored in a digital format. Interaction between the analog portion 3 of the structure and the digital portion 4 is afforded by suitable circuits 5, to be described, realizing a so-called scaling of a current value according to a constant factor which is contained in the registers, to thus obtain a multiplication of such current, define the parameters of the equation to be solved, and convert said current to a voltage for setting the initial conditions. From a purely applicational standpoint, setting these initial conditions is to apply appropriate voltage values to selected capacitors.

FIG. 3 shows a schematic view of the integrated structure 1 of a programmable cellular network according to the invention, which comprises:

an N×N array 6 of cells 2 similar to that described with reference to FIG. 2;

an interface I/O block 7 adapted for input/output data buffering; and at least first 8 and second 9 structurally independent non-volatile memories, with the size of the first memory 8 being N×N×2 bits and that of the second memory 9 being N×N bits.

The first 8 of such memories can store a desired configuration of the array 6; the second memory 9 is used to set the state of a given cell at a desired value.

Figure 4:
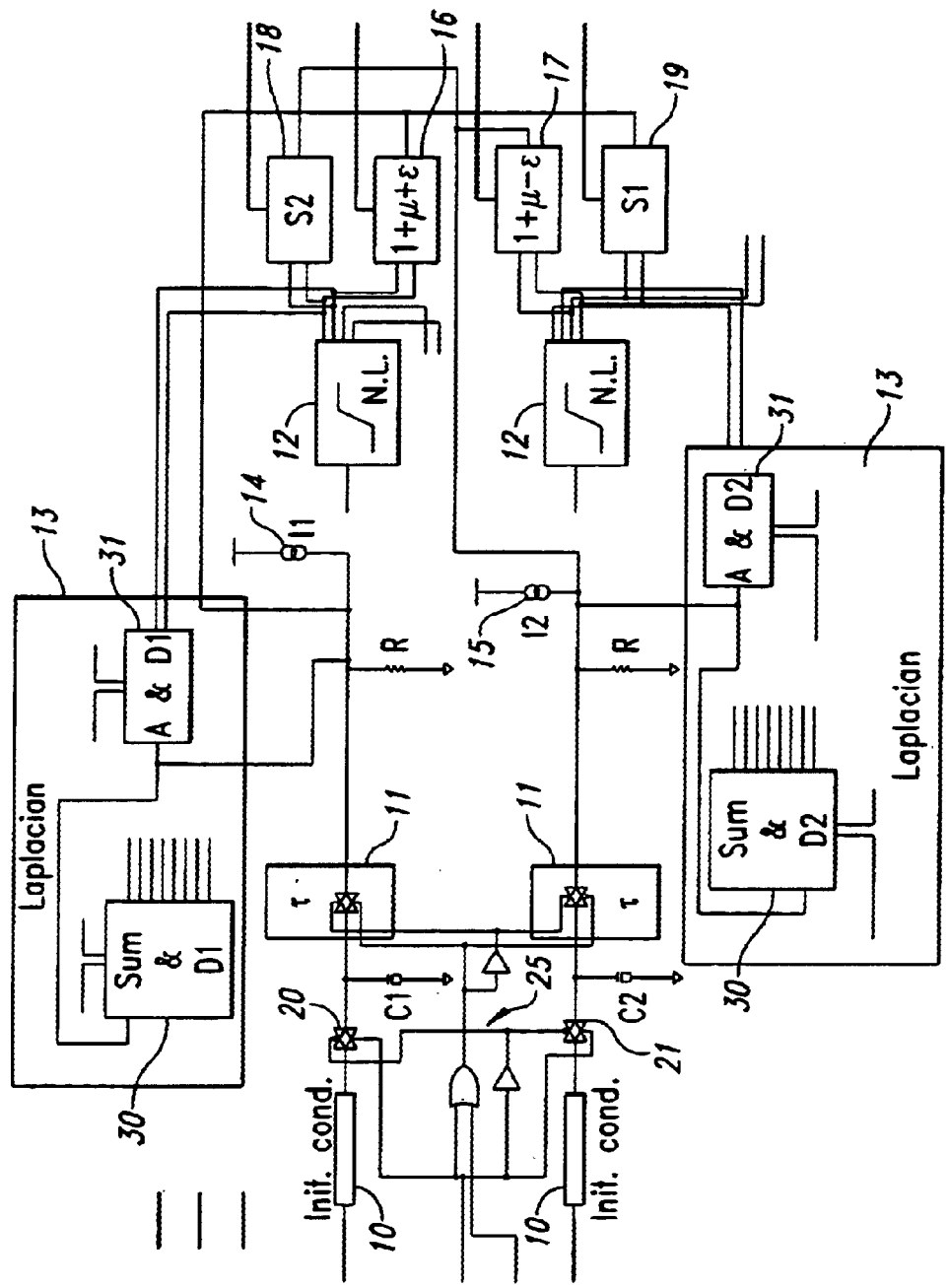
FIGS. 4 and 5 are schematic views showing circuital blocks of the integrated structure according to the invention.
Figure 5:
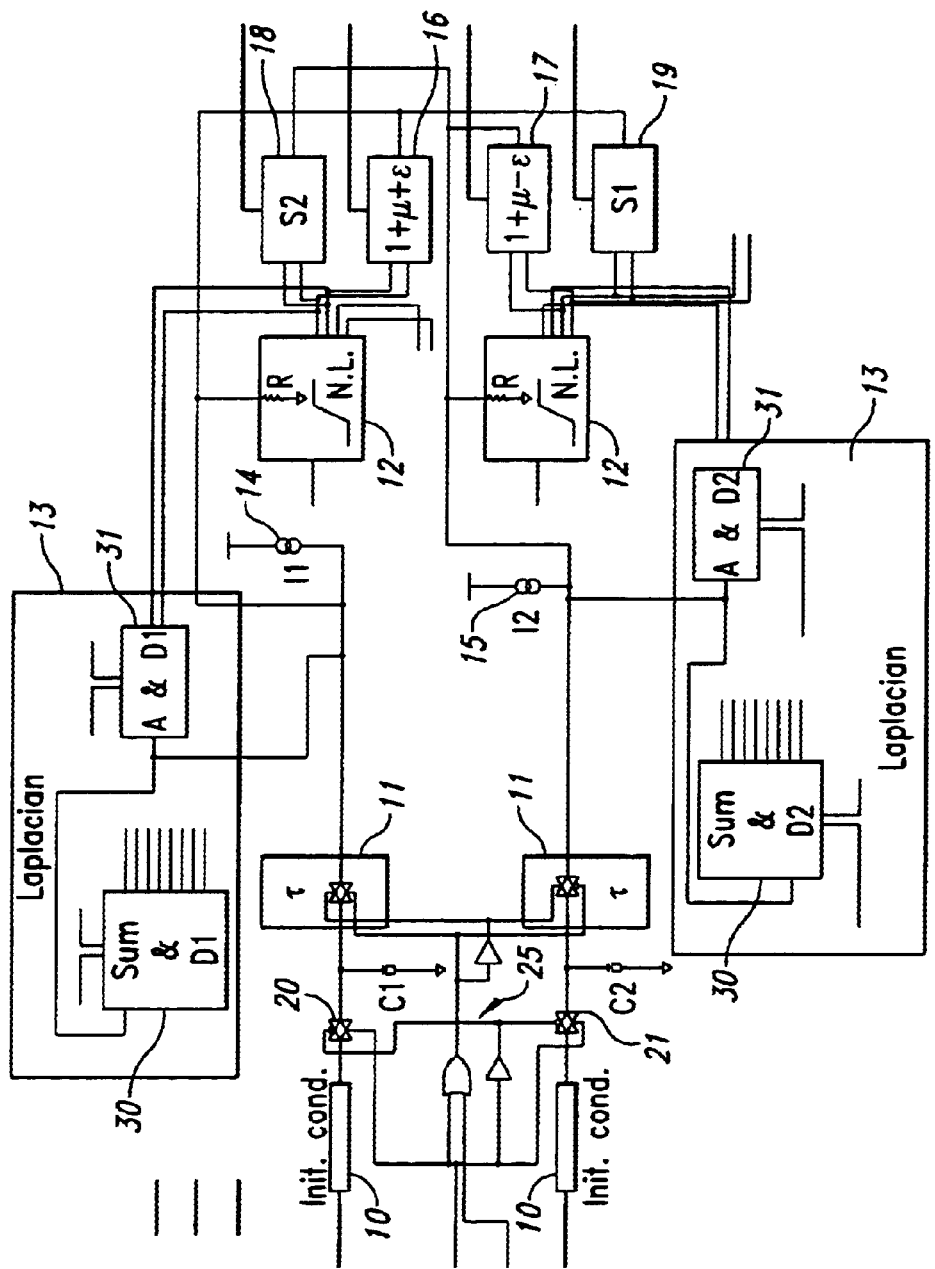

FIGS. 4 and 5 schematically show two possible implementations of the cell 2, in which the correspondence of the previously discussed theoretical blocks of the diagram of FIG. 2 with the actual blocks of the hardware structure can be appreciated.

The data inputs and outputs of an individual analog cell 2 are also obtainable from the Figures.

All of the blocks comprised in the two possible implementations of FIGS. 4 and 5 will now be briefly and qualitatively described, the blocks regarded to be the most important and innovative being discussed in detail later in this specification.

The [Init.Cond.] block 10 is to set pre-fixed conditions for the system at an initial time (zero time). Essentially, the block 10 sets desired voltage values at the head of capacitors comprised in the cell 2.

The [$\tau$] block 11 represents the system time constant, which can be varied within a broad range by changing the system's own frequency.

The [N.L.] block 12 is effective to reproduce the non-linearity of the equation to be represented.

The [Laplaciano] block 13 handles the interactions between the cells 2 in the array 6.

The [i1,i2] blocks 14 and 15 are just current generators.

The [$1+\mu+\epsilon,1+\mu-\epsilon,s1,s2$] blocks 16, 17, 18 and 19, respectively, are current multipliers controlled by digital signals.

Advantageously in this invention, full versatility of the system is achieved by varying the time constant of the individual cell 2, since different applications require radically different working frequencies, e.g., of a few Hertz to thousands of Hertz.

The simplest way of varying the parameter $\tau$ is to change the values of the capacitances C1, C2 comprised in the diagram of the cell 2. However, the time constant $\tau$ of the system is held in the 100 kHz range because of technological constraints.

Figure 6:
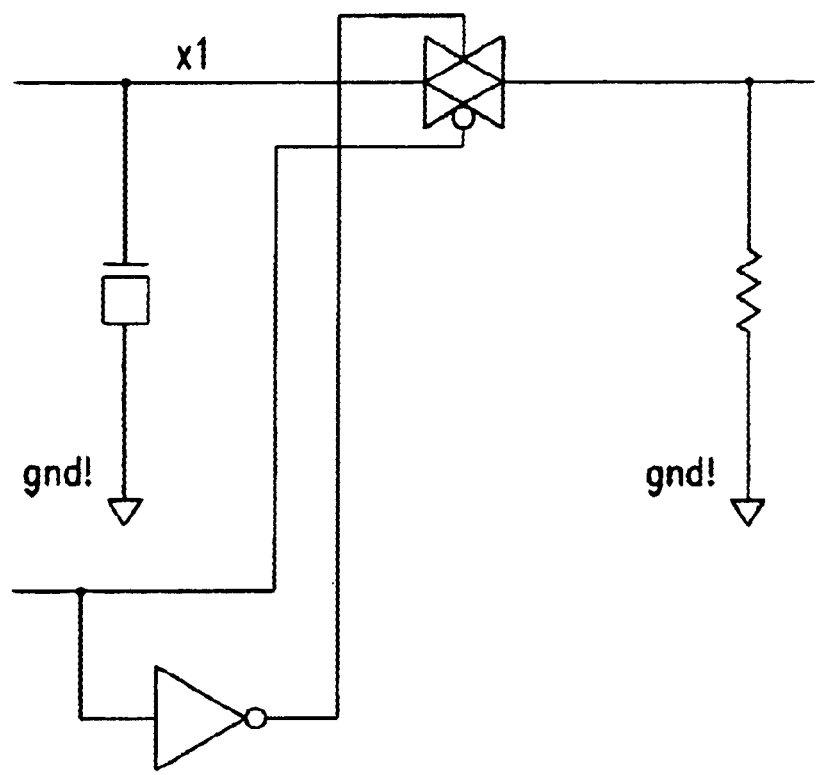
FIG. 6 shows a detail view of the cell structure shown in FIG. 2.

According to the invention, to lower the typical frequency of the cell 2 in a simple way, two switches 29, 32 are provided for use between the capacitances C1, C2 and their corresponding resistors R, each switch being contained in its corresponding block 11 as shown in FIG. 2. FIG. 6 shows an enlarged view of the circuital portion extending between one of the capacitances C1 or C2 and one of the resistors R, which portion containing one of the frequency switches.

The switches 29, 32 are also operative to isolate the capacitances from the rest of the circuital structure.

When the switches 29, 32 are closed, the system evolves, whereas when the switches are open, the system conditions are "frozen." These switches are required to stay open for a much shorter time than the discharge time of the capacitances C1, C2.

Thus, the same curves can be obtained with different frequencies, as shown in FIGS. 7B and 7A illustrating the system response to a variation of the time constant.

With this method, the time constant can even be multiplied by a factor 100 k to obtain frequencies in the range of one Hertz.

The digital-controlled block 10 is arranged to set the individual cells 2 at desired initial conditions, the block 10 outputting a voltage which is proportional to the binary digit stored in a suitable register, which may be a 4-bit register, for example.

Shown in FIG. 8 is an exemplary embodiment of the block 10, which allows to a current-to-voltage conversion.

The structure of a cell 2 is completed by a pair of switches 20, 21, each associated with a corresponding capacitance C1, C2 of the cell 2. These switches 20, 21 are operative to isolate each of the capacitances C1, C2 from the block 10 output.

The switches 20 and 29 are suitably set in opposite phases with each other, as well as the switches 21 and 32.

Figure 9:
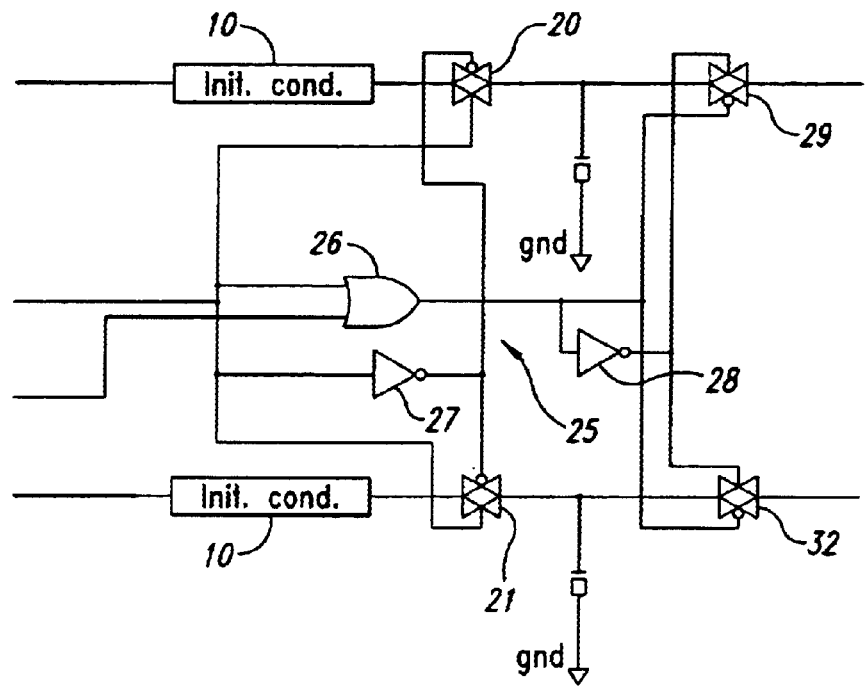
FIG. 9 shows a more detailed schematic view of a circuit portion of the cell 2.

FIG. 9 shows a more detailed view of the circuital portion of FIG. 2 for setting the initial conditions. The network 25 of logic gates 26, 27, and 28 handling a reset signal is also more clearly visible.

The Laplacian block 13 includes two functional portions 30 and 31, having a mode of operation that will be hereafter described.

To create particular sub-matrices or vectors or paths inside the matrix array of cells 2, the following addends in equations (1) and (2) need to be modified, which represent the cell interaction terms:

$$D1(Y1;i-1,j+Y1;i+1,j+Y1;i,j-1+Y1;i,j+1-4Y1;i,j) \quad (4)$$

$$D2(Y2;i-1,j+Y2;i+1,j+Y2;i,j-1+Y2;i,j+1-4Y1;i,j) \quad (5)$$

More particularly, when one cell is to be disconnected from an adjacent cell, it is sufficient to eliminate the corresponding output value from the relations (4) and (5), and to decrease by one the feedback factor 4.

Figure 10:
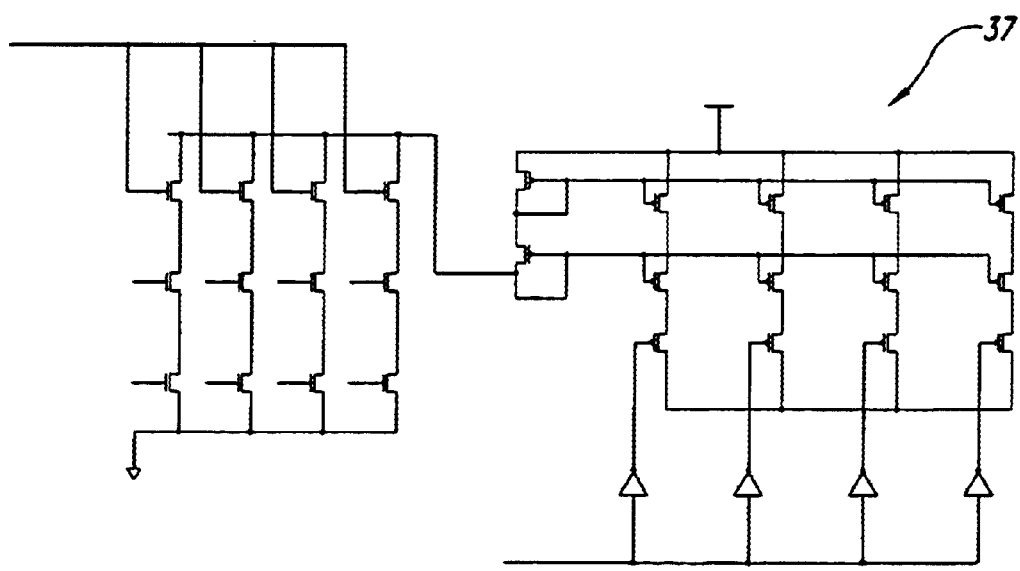
FIGS. 10 and 11 schematically show further embodiments.
Figure 11:
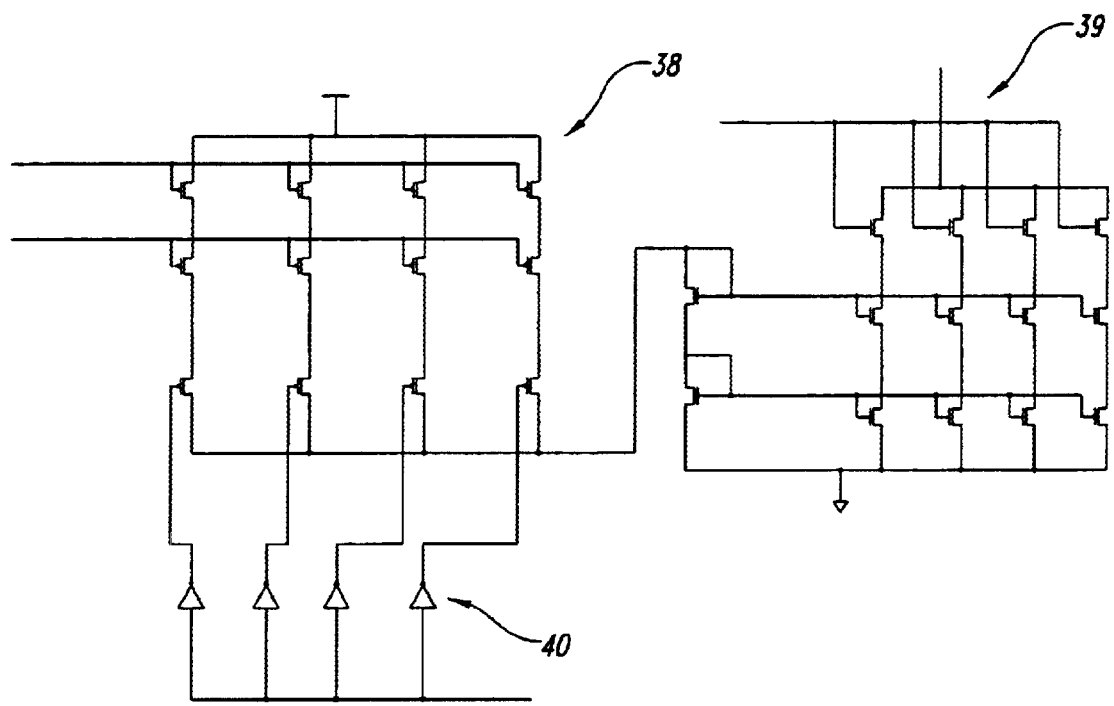

This can be done by means of the circuit blocks 37 and 39, shown in FIGS. 10 and 11, respectively.

The block 37 represents an exemplary circuital embodiment of the block 30 inside the Laplacian block 13. Such block 37 is operative to add together the desired currents of the neighboring cells (Sum) and to multiply the output variables of the neighboring cells by the diffusion factor (Dk).

The block 39 represents indeed an exemplary circuital embodiment of the block 31 inside the Laplacian block 13, and is operative to multiply the output variable by either a factor A or an integer factor between 0 and 4.

Both blocks 37 and 39 are completed by digital current multipliers in order to obtain the product of the summation and the factors Dk.

Shown in FIG. 11 are also reference numerals to circuital portions 38 and 40 to be described.

To obtain the non-linear function represented by the block 12 and shown in the equation defining the behavior of an individual cell, a saturated transconductance amplifier 41 may be used, for example. A circuit diagram of this amplifier 41 is given in FIG. 12. The amplifier 41 essentially comprises a differential stage, so that a sigmoid (Σ-shaped) curve can be obtained, later to be clipped by two constant currents.

Figure 12:
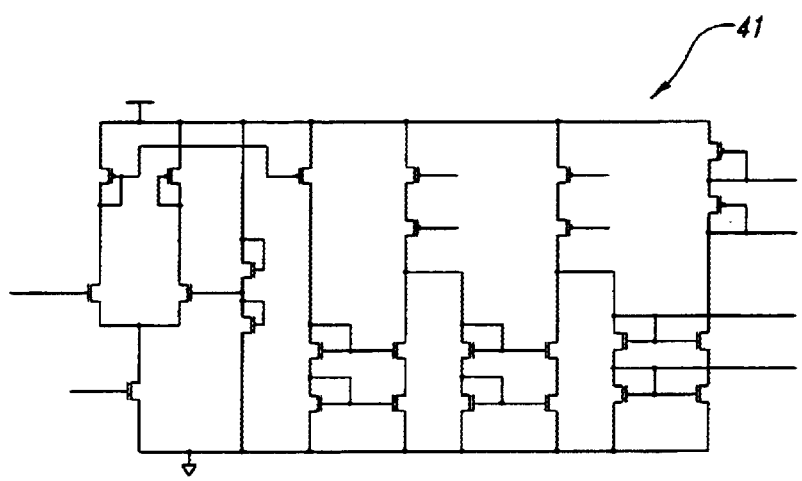
FIG. 12 shows an electric diagram of a transconductance circuit implementing a detail of the cell of FIG. 2.
Figure 13:
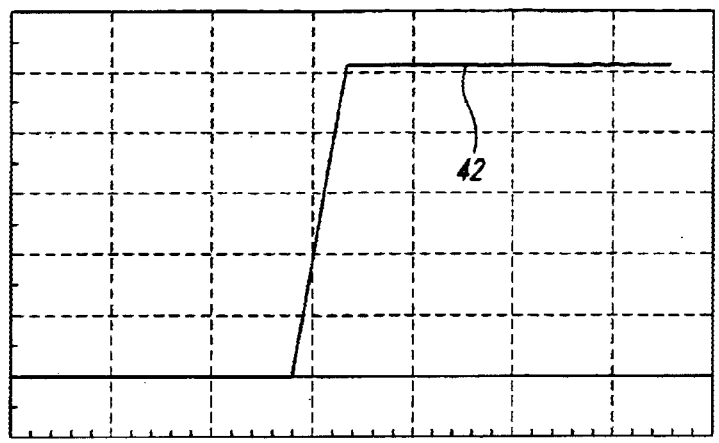
FIG. 13 shows a diagram of a characteristic curve of the circuit of FIG. 12.

FIG. 13 is a plot of voltage vs. current illustrating the transcharacteristic function 42 of the transconductance circuit 41 of FIG. 12.

A further peculiarity for consideration is a resistive element R provided in each cell layer as shown in FIG. 2. The gradient of the characteristic curve of this element should be equal to that of the middle portion of the characteristic curve of the non-linear element, in connection with the phenomenon to be reproduced. In view of the tolerances of current technology resistive elements, problems of the two gradients disagreeing with each other might be encountered.

To obviate this, the resistive element can be seen as a linear function of the voltage applied at its heads, subtracting current from the summing node of FIG. 2, and can therefore be substituted by a transconductor drawing current from that node.

In such a way, the same characteristic function can be used by clipping it with two constant currents, similar as in the previous embodiment, so as to create the non-linear block 12. In this way, the gradients of both curves can be made to agree, and the system relieved of constraints from the tolerances of its constituent elements.

Figure 14:
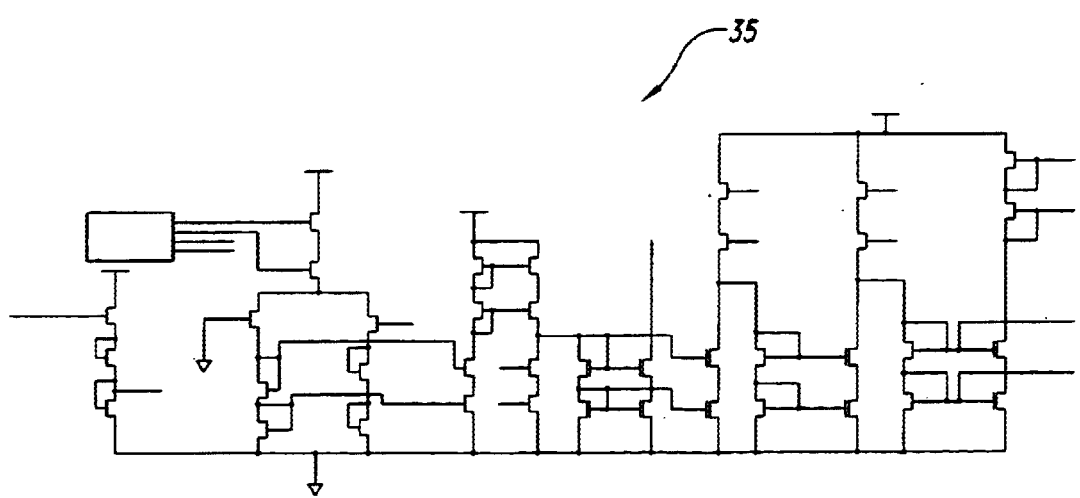
FIG. 14 shows an electric diagram of a further detail of the cell shown in FIG. 2.

An exemplary circuit illustrating this possibility is shown in FIG. 14, where the circuit 35 represents the embodiment of a modified or corrected gradient transconductor.

Figure 15A:
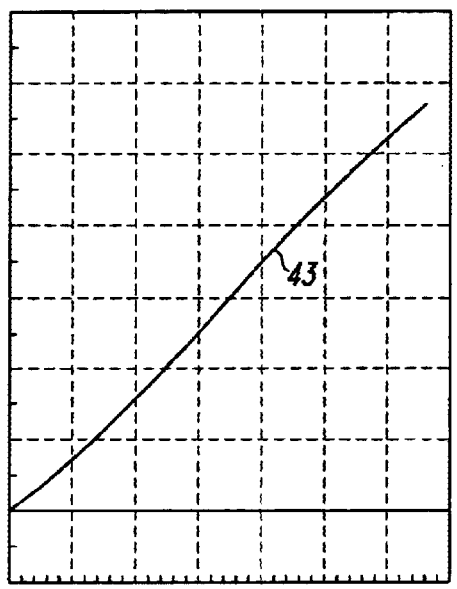
Figure 15A:
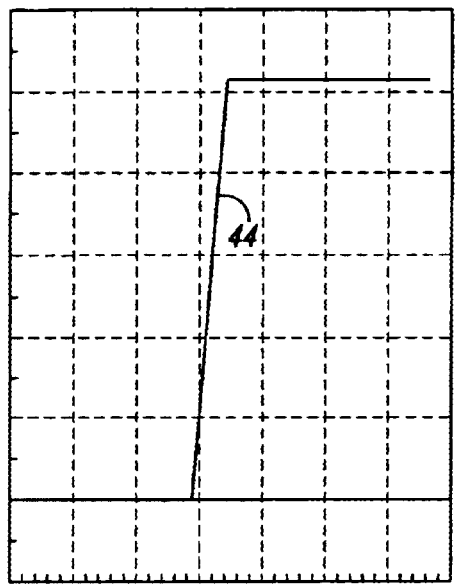

Shown in FIGS. 15A and 15B are examples of this possible embodiment. Curves 43 and 44 show the gradients of the resistive element and the corrected gradient transconductance element, respectively.

Advantageously, the principle of this invention can be applied to industrial automation and robotic. The absence of reflective phenomena in the generation and propagation of auto-waves prevents noise formation, and makes the inventive approach particularly suitable for the construction of transportation supports and aids.

The "in-line" programmability of the inputs provides sophisticated direction control by allowing, for example, several objects laid onto a belt conveyor designed with this philosophy to be routed along different directions according to necessity, without any actions on the belt conveyor itself being required.

Figure 16:
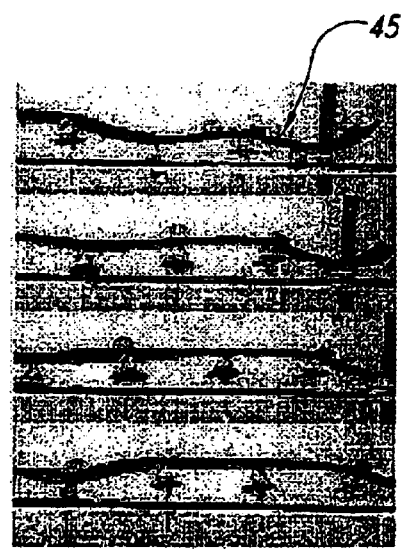
FIG. 16 is a photograph of a driven belt conveyor of the circuital structure of this invention, taken during its transport action.

FIG. 16 shows, by way of example, a prototype of a belt conveyor capable of transporting an object, here a small ball, from a fixed station to another desired station, according to a diffusive control as described hereinabove.

Of course, the invention also allows the development of robot architectures, which have an analog locomotion system inspired by biological deambulation.

A six-limbed robot prototype has been made by the Applicant. Such prototype is able to independently move by means of an auto-wave propagation. This auto-wave is generated by a discrete element circuital structure whereby the propagation of a wave can be activated on a cell vector from which the self-propagating wave is picked up to directly drive the robot servoes.

Thus, the invention allows the realization of a cellular network circuital integrated architecture adapted to solve partial-derivative differential equations, whereby electrical signals can be picked up, such signals having the typical periodicity of physical phenomena, such as auto-waves used to drive robot architectures able to independently move.

In addition, a number of this invention's features make it specially suitable for a variety of applications, such as:

1) a re-configurable network, meaning feasibility of an array of cells 2 which can be used as a whole or in one or more subassemblies (vectors, subarrays, special patterns, etc.);
2) programmability, meaning the faculty to set the structure, the parameters, and the initial conditions of the array.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

What is claimed is:

1. An integrated cellular network structure that is programmable to solve partial derivative differential equations in order to control a phenomenon of diffusion or a propagation of electric drive pulses for robot actuators, comprising analog and digital portions interconnected to each other, said analog portion including a matrix array of analog cells arranged to receive data from an input/output interface, and said digital portion comprising a first and a second memory matrix arrays arranged to store a desired configuration and the initial state, respectively, of said analog matrix array.

2. The integrated structure of claim 1 wherein said memory matrix arrays are structurally independent.

3. The integrated structure of claim 1, comprising in the analog matrix array a block connected to said interface for setting predetermined initial conditions to the structure.

4. The integrated structure of claim 3 wherein said predetermined initial conditions comprise setting potential values for capacitors contained in the analog matrix array.

5. The integrated structure of claim 1 wherein the cells of the analog matrix array are two-layer cells.

6. The integrated structure of claim 5 wherein each analog cell includes a block having a variable time constant for individually modifying the frequency of each cell.

7. The integrated structure of claim 6 wherein the block comprises a time constant block having at least one switch for selectively connecting each capacitor to corresponding resistors.

8. The integrated structure of claim 1 wherein said analog cell (includes current multipliers driven by digital signals.

9. The integrated of claim 1 wherein each cell includes at least a Laplacian block operative to control the interaction between adjacent cells of the analog matrix array.

10. The integrated structure of claim 1 configured to solve the following differential equations:

$$dX1;i,j/dt=-X1;i,j+(1+\mu+\epsilon)Y1;i,j-s1Y1;i,j+D1(Y1;i-1,j+Y1;i+1,j+Y1;i,j-1++Y1;i,j+1-4Y1;i,j) \tag{1}$$

$$dX2;i,j/dt=-X2;i,j+(1+\mu+\epsilon)Y2;i,j-s2Y2;i,j+D2(Y2;i-1,j+Y2;i+1,j+Y2;i,j-1++Y2;i,j+1-4Y1;i,j) \tag{2}.$$

11. An integrated cellular network structure programmable to solve partial derivative differential equations for controlling diffusion and propagation of electric drive pulses for robotic actuators, the structure comprising:

an analog circuit having a matrix array of analof cells configured to receive data from an input/output interface; and a digital circuit comprising a first memory matrix array configured to store a desired configuration of the matrix array of the analog circuit and a second memory matrix array configured to store an initial state of the matrix array of the analog circuit.

12. The structure of claim 11 wherein the analog and digital circuits are interconnected and configured to solve the following differential equations:

$$dX1;i,j/dt=-X1;i,j+(1+\mu+\epsilon)Y1;i,j-s1Y1;i,j+D1(Y1;i-1,j+Y1;i+1,j+Y1;i,j-1++Y1;i,j+1-4Y1;i,j) \tag{1}$$

$$dX2;i,j/dt=-X2;i,j+(1+\mu+\epsilon)Y2;i,j-s2Y2;i,j+D2(Y2;i-1,j+Y2;i+1,j+Y2;i,j-1++Y2;i,j+1-4Y1;i,j) \tag{2}.$$

13. An integrated cellular network structure programmable to solve partial derivative differential equations in order to control diffusion and propagation of electric drive pulses for robotic actuators, the structure comprising:

an analog circuit comprising a matrix array of two-layer analog cells configured to receive data from an input/output interface, each two-layer cell comprising a block having a variable time constant for individually modifying a frequency of each analog two-layer cell; and a digital circuit comprising a first memory matrix array configured to store a desired configuration of the matrix array of the analog circuit and a second memory matrix array configured to store an initial state of the matrix array of the analog circuit.

14. The structure of claim 13 wherein the analog and digital circuits are interconnected and configured to solve the following differential equations:

$$dX1;i,j/dt=-X1;i,j+(1+\mu+\epsilon)Y1;i,j-s1Y1;i,j+D1(Y1;i-1,j+Y1;i+1,j+Y1;i,j-1++Y1;i,j+1-4Y1;i,j) \tag{1}$$

$$dX2;i,j/dt=-X2;i,j+(1+\mu+\epsilon)Y2;i,j-s2Y2;i,j+D2(Y2;i-1,j+Y2;i+1,j+Y2;i,j-1++Y2;i,j+1-4Y1;i,j) \tag{2}.$$

15. The structure of claim 14 wherein the block in each two-layer analog cell comprises a time constant block having at least one switch for selectively connecting capacitors in the matrix array of the analog circuit for setting potential values for the predetermined initial conditions.

* * * * *